May 8, 1951 J. R. RAMSEY 2,551,635
DRUM BEATER
Filed Oct. 27, 1947 2 Sheets-Sheet 1

INVENTOR
JOHN R. RAMSEY
BY Cook and Schermerhorn
ATTORNEYS

May 8, 1951    J. R. RAMSEY    2,551,635
DRUM BEATER
Filed Oct. 27, 1947    2 Sheets-Sheet 2

INVENTOR
JOHN R. RAMSEY

BY Cook and Schermerhorn

ATTORNEYS

Patented May 8, 1951

2,551,635

UNITED STATES PATENT OFFICE 2,551,635

DRUM BEATER

John R. Ramsey, Eugene, Oreg.

Application October 27, 1947, Serial No. 782,371

8 Claims. (Cl. 84—422)

This invention relates to a novel bass drum beater mechanism.

Objects of the invention are to provide an improved drum beater mechanism to give quicker action with less fatigue to the drummer than conventional beaters, to provide a beater of relatively simple, low cost construction and having few parts, and to provide a beater which is easily assembled and easily folded compactly for carrying.

The present construction comprises a base and integral standards having anti-friction bearings for mounting a beater trunnion shaft. A spreader plate is removably secured to one side of the base by an adjustable clamp which is also adapted to engage the rim of the drum on the other side of the base to hold the beater mechanism in a fixed relation to the drumhead. A foot treadle for operating the beater is mounted in anti-friction bearings on the spreader plate and connected by a link with the beater shaft. The parts are maintained in the desired rest position with the beater spaced from the drumhead by a pair of opposed coil springs on the opposite ends of the beater shaft. These springs are adapted to be anchored at their inner ends to the shaft in different positions to vary the spring tension and preloading of the springs, and to adjust the rest position of the beater to control the length of stroke of the beater. The springs are housed in cup-like shields on the base standards with their outer ends anchored thereto in such a way that they may be easily released to swing the beater around between the standards in folding the device for carrying. In folding the device, the pivotal connections are not taken apart, the spreader plate merely being moved from the base member by the act of unclamping the base from the drum. When the device is removed from the drum, the spreader bar is thereby released so that it may be folded compactly with the other parts without disassembling any of the pivotal connections in the various bearings and without removing the beater from its trunnion shaft.

The improvement in the spring action and the improvement in the manner of folding the device for carrying, as well as other objects and advantages of the present construction, will be better understood with reference to the following description in connection with the accompanying drawings illustrating a preferred embodiment of the invention. It is to be understood, however, that the drawings are intended merely to illustrate the principles of the invention and not to limit the invention, as various changes in the construction and arrangement of parts will occur to persons skilled in the art. All such modifications within the scope of the appended claims are included in the invention.

Figures 3, 8:
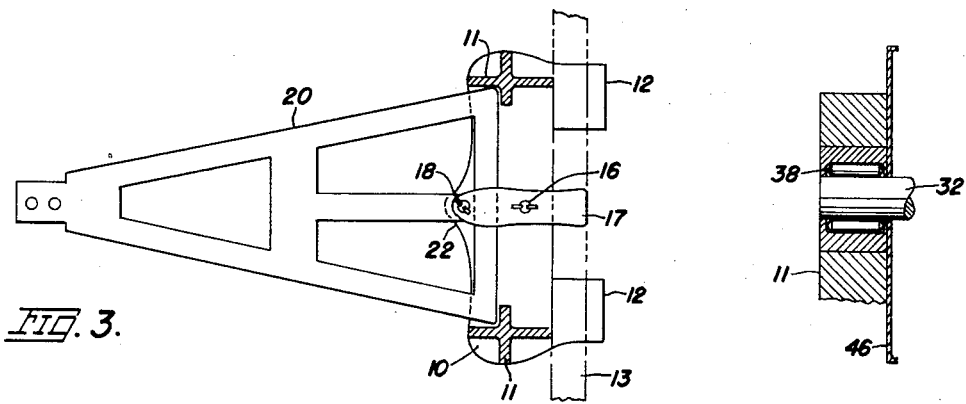
Figure 3 is a plan view of the base and spreader plate, taken on the line 3—3 of Figure 1.
Figure 8 is a sectional view of one of the beater shaft bearings, taken on the line 8—8 of Figure 1.
Figures 7, 9:
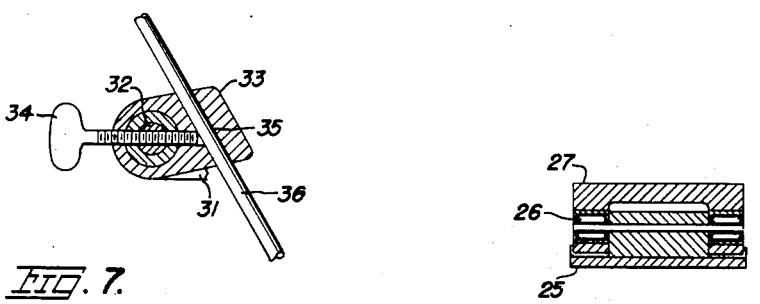
Figure 7 is a sectional view through the beater shaft, taken on the line 7—7 of Figure 2.
Figure 9 is a sectional view of the treadle mounting, taken on the line 9—9 of Figure 1.

The operating parts of the present beater mechanism are mounted on and attached to a base member 10 having a pair of integral upright standards 11. The base 10 has a pair of feet 12 arranged to project under the rim 13 of a bass drum, so that the said rim engages the standards 11 as shown in Figure 3. Between the feet 12 the base 10 is cut out to receive the spreader plate and foot treadle when the device is folded in a manner to be presently described.

Figure 1:
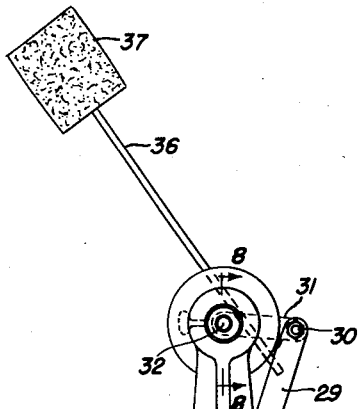
Figure 1 is a side elevation view of a preferred embodiment of the invention.
Figure 1:
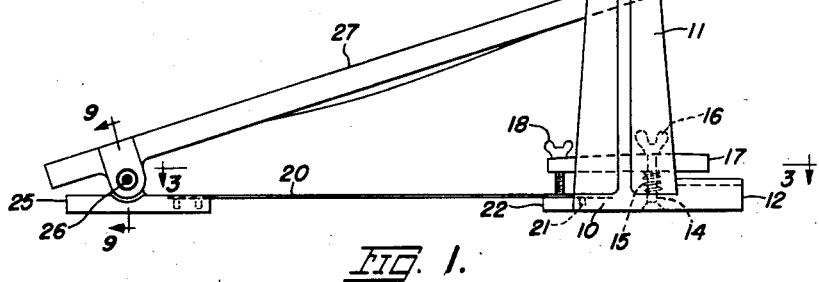

Mounted centrally in the base 10 is an upstanding screw 14 carrying a spring 15 and a wing nut 16. Mounted on the screw 14 between the spring 15 and the wing nut 16 is a clamping member 17 having one end adapted to project out between the feet 12 on one side of the base to clamp against the rim of the drum, and having an opposite end provided with a thumb screw 18 to clamp a spreader plate 20 on the other side of the base. The spreader plate 20 is triangular in shape as shown in Figure 3, having its broad end adapted to fit in between the posts 11 in the manner shown. Additional means to hold the spreader plate 20 securely in its proper position is provided by a projection 21 on the under side of the plate which is adapted to engage in a slot in the base member as shown in Figure 1. A central portion 22 of the base 10 extends out under the spreader plate 20 to provide bearing under the thumb screw 18 so that when this screw and the wing nut 16 are properly tightened with the drum in place the projection 21 will be clamped in its base slot and spreader plate 20 will become rigid with the base.

The other end of the spreader plate 20 carries a treadle support 25 having anti-friction bearings 26, such as needle bearings, for the heel end of a pivotally mounted foot treadle 27. Preferably the bearing 26 supports the treadle at a short distance from the heel end thereof so that the drummer's foot may be placed on the treadle with his heel balanced on this bearing support. The toe end of the treadle 27 is pivotally connected by a suitable bearing 28 with a pair of links 29 which are similarly connected through a bearing 30 with a pair of lever arms 31 on the beater trunnion shaft 32. The bearings 28 and 30 are preferably of a type known as oilless bronze bearings. The arms 31 form an integral part of a bracket 33 which is secured in a fixed position on the shaft 32 by a thumb screw 34 passing through the shaft. The hole in the bracket 33 for this thumb screw intersects a hole 35 to receive the stem 36 for the beater ball 37, so that the thumb screw may be tightened as a set screw to also hold the beater ball in any desired position in the hole 35. The ends of the beater shaft 32 form trunnions mounted in anti-friction bearings 38, such as ball or needle bearings, in the top of the standards 11, as shown in Figure 8.

Figure 5:
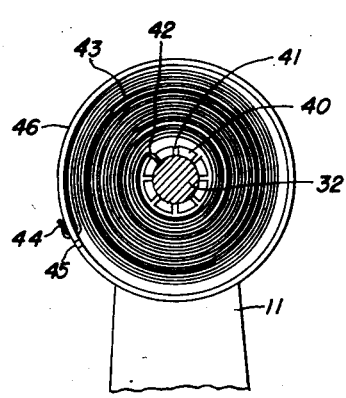
Figure 5 is a view of one of the springs, taken on the line 5—5 of Figure 2.
Figure 6:
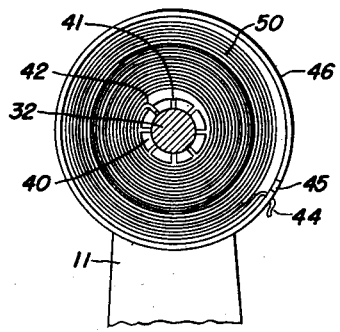
Figure 6 is a view of the other spring, taken on the line 6—6 of Figure 2.

An important feature of the present construction resides in the type and arrangement of springs to produce an improved rapid and substantially effortless action in the mechanism. As shown in Figures 5 and 6, the shaft 32 is provided at each end with a spring anchor 40 in the form of a shoulder integral with the shaft and having a series of slots 41 to receive the bent inner end 42 of a flat coil spring which in Figure 5 is the spring 43. The slots 41 are preferably sufficient in number to provide a large number of quite closely spaced anchor points for the spring end. The outer end of the spring 43 is formed into a hook 44 to engage in a slot 45 in a stationary cup-like shield 46 around the spring, which shield is mounted on the standard 11. The notch 45 preferably has an entrance portion slightly offset from its seating portion to securely retain the hook end 44 against accidental displacement, while at the same time permitting the end 44 to be easily drawn back and disengaged from the notch. At the other end of the beater shaft a similar spring 50 has a bent inner end 42 anchored in a slot 41 in an anchor member 40 and an outer hook end 44 anchored in a slot 45 in a shield 46, as shown in Figure 6.

Figure 2:
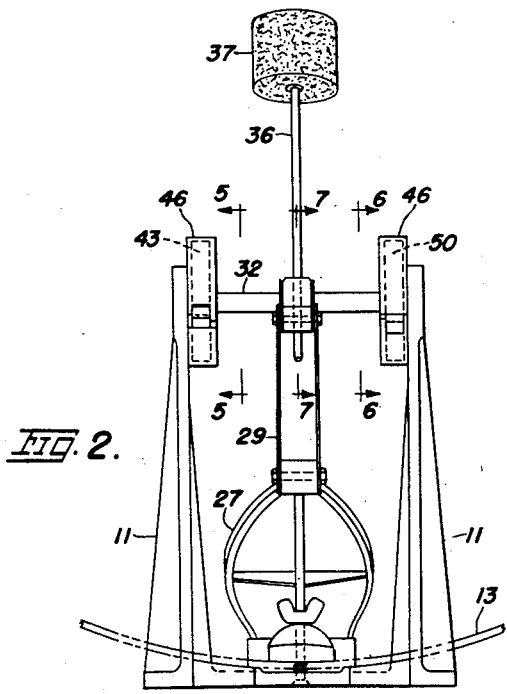
Figure 2 is an end elevation view from the drum side of the mechanism.

It will be observed in comparing Figures 5 and 6, with reference to the parent Figure 2, that the springs 43 and 50 are reversed to act in opposition to each other. The spring 50 acts on the shaft 32 in a direction to pull the beater 37 away from the drum, and the spring 43 acts on the shaft in a direction to pull the beater toward the drum. Thus, if the two springs are set in the proper position with some initial tension, the beater will assume a rest position where the forces of the two springs are balanced and neutralized. When the treadle 27 is depressed, the beater 37 will be moved toward the drum with the spring 43 assisting this movement and the spring 50 resisting the movement. Then, if the treadle were to be released when the beater reaches striking position, the beater would be returned by the spring 50 against the opposition of spring 43 until it had reached its neutral position where the two spring forces were equal. The inertia of the beater, however, carries it back beyond its neutral position until its rebound momentum is checked by the spring 43, which is, of course, being wound tighter as the rebound continues beyond the equilibrium position. At the same time, the retractive force of the spring 50 is rapidly lessening so that the resultant action of the spring combination is to provide a quicker natural return of the beater toward the drum after each rebound without requiring the operator to check the rebound with his foot. This results in faster acceleration of the drum beater toward the drum and a higher natural frequency of oscillation of the mechanism for a beater of a given weight, so that the drummer can beat out a fast tempo with less effort applied to the foot treadle. The greatest advantage of the present mechanism resides in its ability to produce a faster tempo of drum beats than conventional drum beaters, without fatigue to the drummer.

Both the spring force applied to the beater and the equilibrium or rest position of the beater are determined by the particular notches 41 in which the two spring ends 42 are placed. If only one of the spring ends 42 is shifted to a different notch, the equilibrium position of the shaft will be changed so that the beater will then come to rest either closer to or farther from the diaphragm of the drum. In this way the length of the stroke can be varied. However, if both spring ends 42 are moved the same distance in opposite directions, the tension of both springs will obviously be increased or reduced by the same amount to leave the beater in the same position at rest. Such an adjustment is used to obtain the desired treadle pressure and to vary the natural frequency of oscillation of the beater. The present mechanism is thereby easily adjustable to give widely varied types of action to suit the preference of different drummers and to most easily produce a very fast or very slow tempo.

Figure 4:
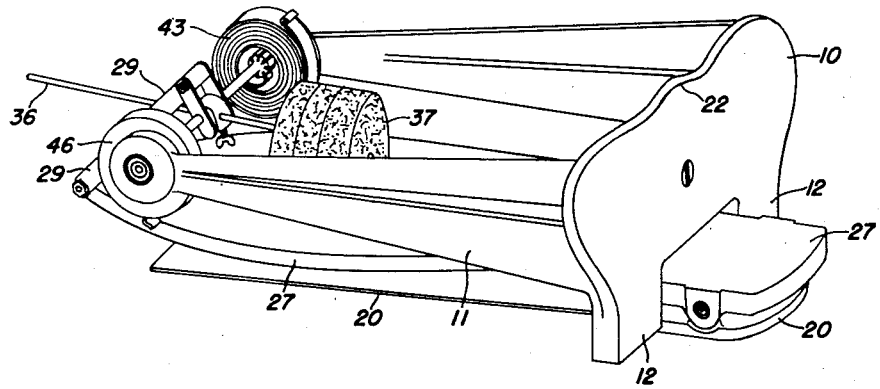
Figure 4 is a perspective view of the device folded for carrying.

The mechanism is easily folded for carrying or packing. When the thumb screws 16 and 18 are loosened to release the clamping member 17 from the rim of the drum, the spreader plate 20 is at the same time released from the base 10. By disengaging the spring ends 44 from the notches 45, the beater shaft 32 is free to revolve in its bearings. The stem 36 passes between the pairs of arms 31 and links 29 without removing the stem from the hole 35. The spreader plate 20 and treadle 27 are then swung around the shaft 32 to the opposite side of the standards 11 with the heel portion of the treadle received in the cut-out portion of the base between the two feet 12, as shown in Figure 4. The beater 37 is thereby disposed between the standards 11, and the whole mechanism occupies a space not substantially larger than is required for the base 10 and standards 11. When the parts are thus compactly folded, the spring ends 42 tend to remain in their notches, so that when the device is again set up it is not necessary to find the proper notches for the ends 42, but only to snap the outer ends 44 in their respective notches 45. Such folding of the parts requires none of the bearings or pivotal connections to be pulled apart and does not produce any loose parts to become lost.

Having now described my invention and in what manner the same may be used, what I claim as new and desire to protect by Letters Patent is:

1. In a drum beater, a rotatable beater shaft, a pair of opposed coil springs on said beater shaft, shoulders on said beater shaft, a plurality of notches in said shoulders for anchoring the inner ends of said springs in different positions, stationary shields enclosing said springs, and notches in said shields to anchor the outer ends of said springs.

2. In a drum beater mechanism, a rotatable beater shaft, a bracket on said beater shaft, a hole passing through said bracket to receive the stem of a drum beater, and a thumb screw in said bracket passing through said shaft and engaging said beater stem to provide length adjustment for said beater stem in said bracket and to secure said bracket to said shaft.

3. In a drum beater having a rotatable beater shaft with a beater ball, a first spring acting on said shaft to rotate the shaft in one direction, and a second spring acting on the shaft to rotate the shaft in the opposite direction to cause the shaft to assume a rest position determined by the balancing of the opposed forces of the two springs, oscillation of the shaft in one direction being assisted by said first spring and opposed by said second spring and oscillation in the opposite direction being opposed by said first spring and assisted by said second spring.

4. In a drum beater having a rotatable beater shaft with a beater ball, a first spring acting on said shaft to rotate the shaft in one direction, a second spring acting on the shaft to rotate the shaft in the opposite direction to cause the shaft to assume a rest position determined by the balancing of the opposed forces of the two springs, oscillation of the shaft in one direction being assisted by said first spring and opposed by said second spring and oscillation in the opposite direction being opposed by said first spring and assisted by said second spring, and means for adjusting said springs to change the spring forces acting on the shaft and to change said rest position of the shaft for varying the length of stroke of the beater ball between said rest position and the drum.

5. A drum beater comprising a base having a pair of standards, a beater shaft mounted for oscillation in said standards, a coil spring mounted on said shaft adjacent one of said standards to rotate the shaft in one direction, an opposed coil spring mounted on said shaft adjacent the other standard to rotate the shaft in the opposite direction to cause the shaft to assume a rest position where the opposed forces of the two springs are in balance, means on said standards for anchoring the outer ends of said springs, and individual means for anchoring the inner end of each spring to the shaft in adjusted position to change the rest position of the shaft and to change the spring forces acting on the shaft.

6. A drum beater comprising a base having a pair of standards, a beater shaft mounted for oscillation in said standards, a coil spring mounted on said shaft adjacent one of said standards to rotate the shaft in one direction, an opposed coil spring mounted on said shaft adjacent the other standard to rotate the shaft in the opposite direction to cause the shaft to assume a rest position where the opposed forces of the two springs are in balance, means for anchoring the inner end of each spring on the shaft, spring shields on said standards having means for anchoring the outer ends of the springs, and individual means for adjusting one of said anchor means for each spring to change the rest position of the shaft and to change the spring force acting on the shaft.

7. A folding drum beater comprising a base having a pair of spaced standards, a beater shaft mounted for oscillation in said standards, a beater ball having a stem mounted on said shaft, a foot treadle connected by a link with said beater shaft, a spreader plate having a pivotal mounting for said treadle, a pair of spaced feet projecting from one side of said base adjacent said standards to engage under the rim of a drum, a clamp member on said base having one end extending between said feet to clamp the rim of the drum against said feet, said clamp member having another end overlying the opposite side of said base to clamp said spreader plate on top of said base on the opposite side of the base from the drum, said clamp member being movable to clear said space between said feet, said treadle and spreader plate being disposed in folded position flat and compactly substantially parallel with said standards and against said base in the space between said feet on the drum side of said base with said spreader plate disconnected from the base and with said link remaining connected between the treadle and the beater shaft.

8. A folding drum beater comprising a base having a pair of spaced standards, a beater shaft mounted for oscillation in said standards, a beater ball having a stem mounted on said shaft, a foot treadle connected by a link with said beater shaft, a spreader plate having a pivotal mounting for said treadle, and a clamp member on said base operable to clamp the rim of a drum to one side of said base and to clamp said spreader plate on the opposite side of said base, said treadle and spreader plate having a folded position disposed flat and compactly against the drum side of the base with the spreader plate disconnected from the base and with said link remaining connected between the treadle and the beater shaft.

JOHN R. RAMSEY.

REFERENCES CITED

The following references are of record in the file of this patent:

UNITED STATES PATENTS

| Number | Name | Date |
|---|---|---|
| 500,970 | Sperl | July 4, 1893 |
| 640,114 | Dowling | Dec. 26, 1899 |
| 1,360,031 | Scherurer et al. | Nov. 23, 1920 |
| 1,804,128 | Strupe | May 5, 1931 |
| 2,132,211 | Hueckstead | Oct. 4, 1938 |